United States Patent
Houtsaeger

(10) Patent No.: US 11,189,124 B2
(45) Date of Patent: Nov. 30, 2021

(54) POD DISPENSER

(71) Applicant: EVOCA S.P.A., Milan (IT)

(72) Inventor: Laurent Houtsaeger, Valbrembo (IT)

(73) Assignee: EVOCA S.P.A., Milan (IT)

( * ) Notice: Subject to any disclaimer, the term of this patent is extended or adjusted under 35 U.S.C. 154(b) by 693 days.

(21) Appl. No.: 15/754,522

(22) PCT Filed: Sep. 2, 2016

(86) PCT No.: PCT/IB2016/055278
§ 371 (c)(1),
(2) Date: Feb. 22, 2018

(87) PCT Pub. No.: WO2017/037675
PCT Pub. Date: Mar. 9, 2017

(65) Prior Publication Data
US 2018/0253927 A1   Sep. 6, 2018

(30) Foreign Application Priority Data

Sep. 2, 2015 (EP) .................................... 15183584
Sep. 3, 2015 (IT) ......................... 102015000048448

(51) Int. Cl.
*G07F 11/44* (2006.01)
*B65D 85/804* (2006.01)
(Continued)

(52) U.S. Cl.
CPC ........... *G07F 11/44* (2013.01); *A47J 31/3642* (2013.01); *B65D 85/8046* (2013.01);
(Continued)

(58) Field of Classification Search
CPC .. A47J 31/3642; B65D 85/8046; G07F 11/24; G07F 11/26; G07F 11/44; G07F 11/58
See application file for complete search history.

(56) References Cited

U.S. PATENT DOCUMENTS 3,072,293 A * 1/1963 Greten ..................... B27N 3/14
                                                  222/55
3,237,753 A * 3/1966 Allen ................. B65G 21/2036
                                                198/689.1
(Continued)

FOREIGN PATENT DOCUMENTS

EP   0779502    6/1997
EP   1797800    6/2007
(Continued)

OTHER PUBLICATIONS

International Search Report and Written Opinion for International Application No. PCT/IB2016/055278 dated Dec. 9, 2016.

*Primary Examiner* — Gene O Crawford
*Assistant Examiner* — Kelvin L Randall, Jr.
(74) *Attorney, Agent, or Firm* — Dorsey & Whitney LLP

(57) ABSTRACT

A dispenser (1) of pods (2) for the production of brewed beverages; the dispenser (1) is equipped with a magazine (4) for holding pods (2) arranged in random order, a belt conveyor (9) designed to extract the pods (2) one by one from the storage compartment (4) to feed then to an outlet (16) in a feed direction (15), and an agitator device (10), which cooperates with the conveyor (9) to move pods (2) away from the conveyor (9) and is defined by a rotor having a hub (24), which is rotationally mounted about an axis (25) transversal to the feed direction (15) to rotate in the opposite direction to the belt conveyor (9), and blades (26), which, during rotation, define with the belt conveyor (9) and upstream of the outlet (16), a gap (28) designed to allow pods (2) lying flat on the belt (11) of the conveyor (9) to reach the outlet (16).

9 Claims, 4 Drawing Sheets

(51) Int. Cl.
*G07F 11/24* (2006.01)
*G07F 11/26* (2006.01)
*G07F 11/58* (2006.01)
*A47J 31/36* (2006.01)

(52) U.S. Cl.
CPC .............. *G07F 11/24* (2013.01); *G07F 11/26* (2013.01); *G07F 11/58* (2013.01)

(56) References Cited

U.S. PATENT DOCUMENTS

| | | | | |
|---|---|---|---|---|
| 3,655,098 | A * | 4/1972 | Schnitzler | B27N 3/14 222/135 |
| 3,690,437 | A * | 9/1972 | Kammann | B65G 47/1471 198/397.01 |
| 3,717,286 | A * | 2/1973 | Crider | F25C 5/20 222/143 |
| 3,772,971 | A * | 11/1973 | Dutro | B65H 29/001 414/789 |
| 3,777,932 | A * | 12/1973 | Matsui | B65G 65/42 221/204 |
| 4,270,670 | A * | 6/1981 | Cristiani | A24C 5/325 198/550.4 |
| 5,207,784 | A | 5/1993 | Schwartzendruber | |
| 5,848,725 | A * | 12/1998 | Saeki | B65G 47/1407 221/131 |
| 5,938,072 | A * | 8/1999 | Lamoureux | G07D 1/00 221/218 |
| 6,702,151 | B1 | 3/2004 | Greenfield et al. | |
| 6,855,100 | B1 | 2/2005 | Bailey et al. | |
| 7,216,590 | B2 * | 5/2007 | Eldridge | E01B 29/24 104/17.1 |
| 8,910,798 | B2 * | 12/2014 | Benjamins | B07B 13/003 209/643 |
| 9,296,545 | B2 * | 3/2016 | Daniels | G07F 11/005 |
| 10,207,857 | B2 * | 2/2019 | Daniels | B65D 83/04 |
| 2016/0244267 | A1 * | 8/2016 | Rendell | B65G 47/31 |

FOREIGN PATENT DOCUMENTS

| | | |
|---|---|---|
| EP | 2443972 | 4/2012 |
| EP | 2860711 | 4/2015 |
| EP | 2902979 | 8/2015 |
| WO | WO00/07881 | 2/2000 |
| WO | WO2015021533 | 2/2015 |

* cited by examiner

POD DISPENSER

TECHNICAL FIELD OF INVENTION

La present invention relates to a pod dispenser, in particular for single-serve pods containing a powdered anhydrous material for making beverages, for example, coffee, tea, soup or similar.

STATE OF THE ART

The present invention finds advantageous application in the vending machine industry, where the use of pod dispensers is known both for the automatic dispensing of pods directly to an external user, and for the automatic production of beverages. In the first case, several dispensers of different types of pods are normally arranged inside a vending machine and selectively activated, following a selection made by a user, to externally dispense a single pod of the chosen type each time. In the second case, one or more pod dispensers are normally arranged inside a beverage vending machine and are selectively activated, following a selection made by the user, to feed, each time, a single pod to a brewing unit located inside the vending machine for making the selected beverage.

In the above-described examples of application and, in general, all cases where the dispensing of single pods is needed, there is awareness of the need for a pod dispenser capable of separating the pods one by one, starting from a large number of pods randomly arranged in a storage compartment, to feed a single pod at a time, arranged with a certain orientation, to an extraction outlet or to an intermediate accumulator device, in which the pods are vertically stacked for subsequently extraction, one at a time, according to need.

SUBJECT OF THE INVENTION

The object of the present invention is to provide an improved type of pod dispenser that enables satisfying the above-described needs and, at the same time, is simple and inexpensive to manufacture.

In accordance with the present invention, a pod dispenser is provided as claimed in claim 1 and, preferably, as claimed in any of the successive claims directly or indirectly dependent on claim 1.

BRIEF DESCRIPTION OF DRAWINGS

The present invention will now be described with reference to the accompanying drawings, which illustrate a non-limitative embodiment, in which.

PREFERRED EMBODIMENTS OF THE INVENTION

Figure 1:
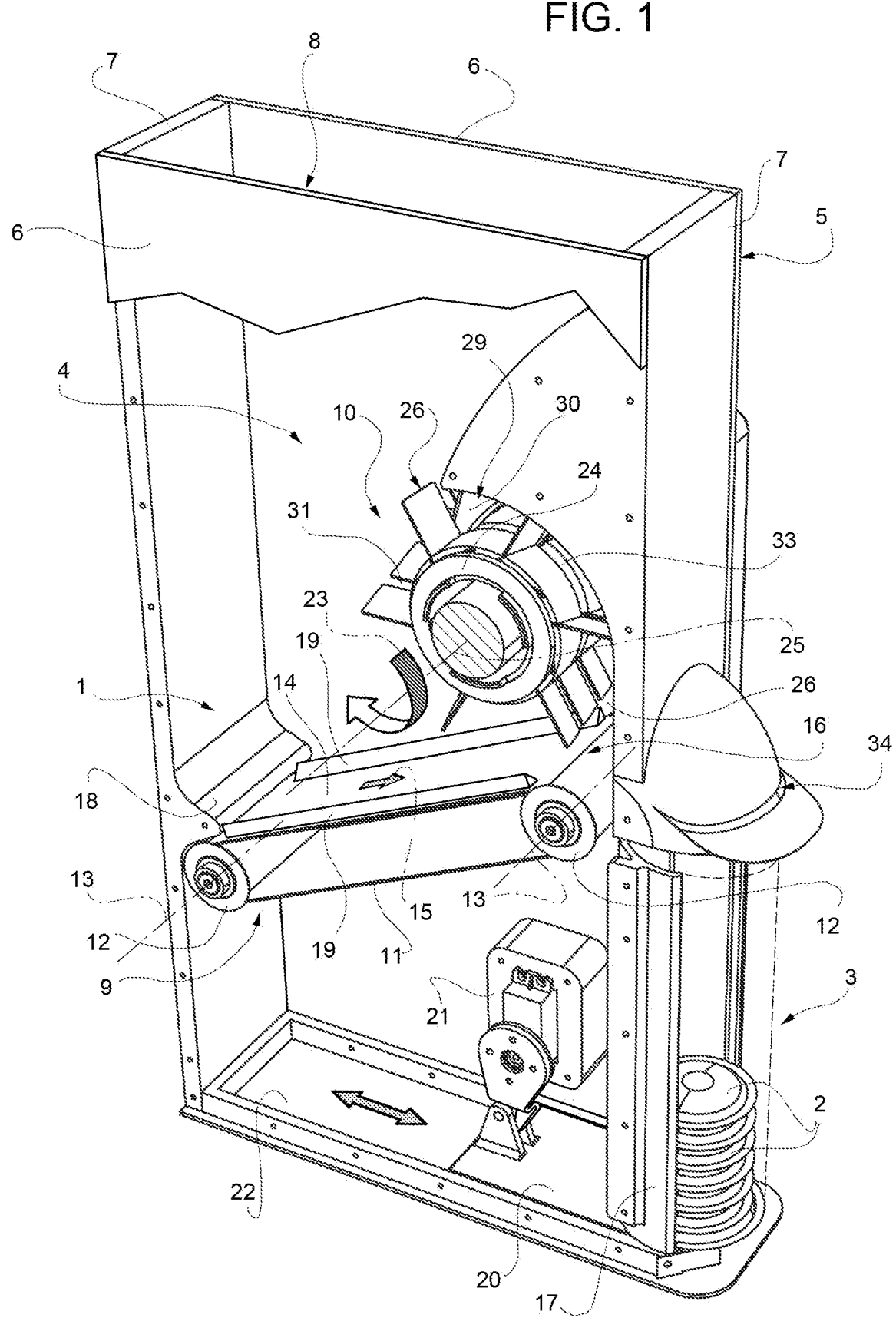
FIG. 1 is a perspective view, with parts removed for clarity, of a preferred embodiment of the pod dispenser of the present invention.

In FIG. 1, reference numeral 1 indicates, as a whole, a dispenser of single-serve pods 2 of known type containing a powdered anhydrous material for making beverages, for example, coffee, tea, soup or similar. In the case in point, the pods 2 have an outer wrapping normally made of paper, plastic or aluminium, and comprising a generically circular central body and an outer annular flange projecting radially from the central body.

The dispenser 1 is designed to be placed inside a vending machine (not shown) to supply single pods 2 to an intermediate accumulator 3, in which the pods 2 are ordered in a vertical stack for being extracted, when required, one at a time from the bottom of the stack and fed to a compartment of the vending machine for a user to take it from the outside.

According to one variant, the intermediate accumulator 3 may not be present and the pods 2 can be fed directly from the dispenser 1 to the external extraction compartment.

Alternatively, the dispenser 1 can be arranged inside a hot beverage vending machine to cooperate with a brewing unit (not shown) designed to receive, each time, a single pod 2 from the dispenser 1 to make a corresponding beverage.

As shown in FIG. 1, the dispenser 1 comprises a magazine or storage compartment 4, which is able to hold a large number of randomly arranged pods 2 and is created in the upper part of a parallelepipedal box-shaped body 5 comprising two longer side walls 6 parallel to each other and substantially vertical, and two shorter side walls 7, which are perpendicular to the longer side walls 6 and, together with the latter, delimit an upper opening 8 designed to allow, in use, an operator to load pods 2 inside the storage compartment 4.

The dispenser 1 also comprises a belt extractor device 9, which is arranged on the bottom of the storage compartment 4 inside the box-shaped body 5 and cooperates with an agitator device 10, this also part of the dispenser 1, to individually extract the pods 2 from the storage compartment 4 and feed them to the intermediate accumulator 3.

Figure 2:
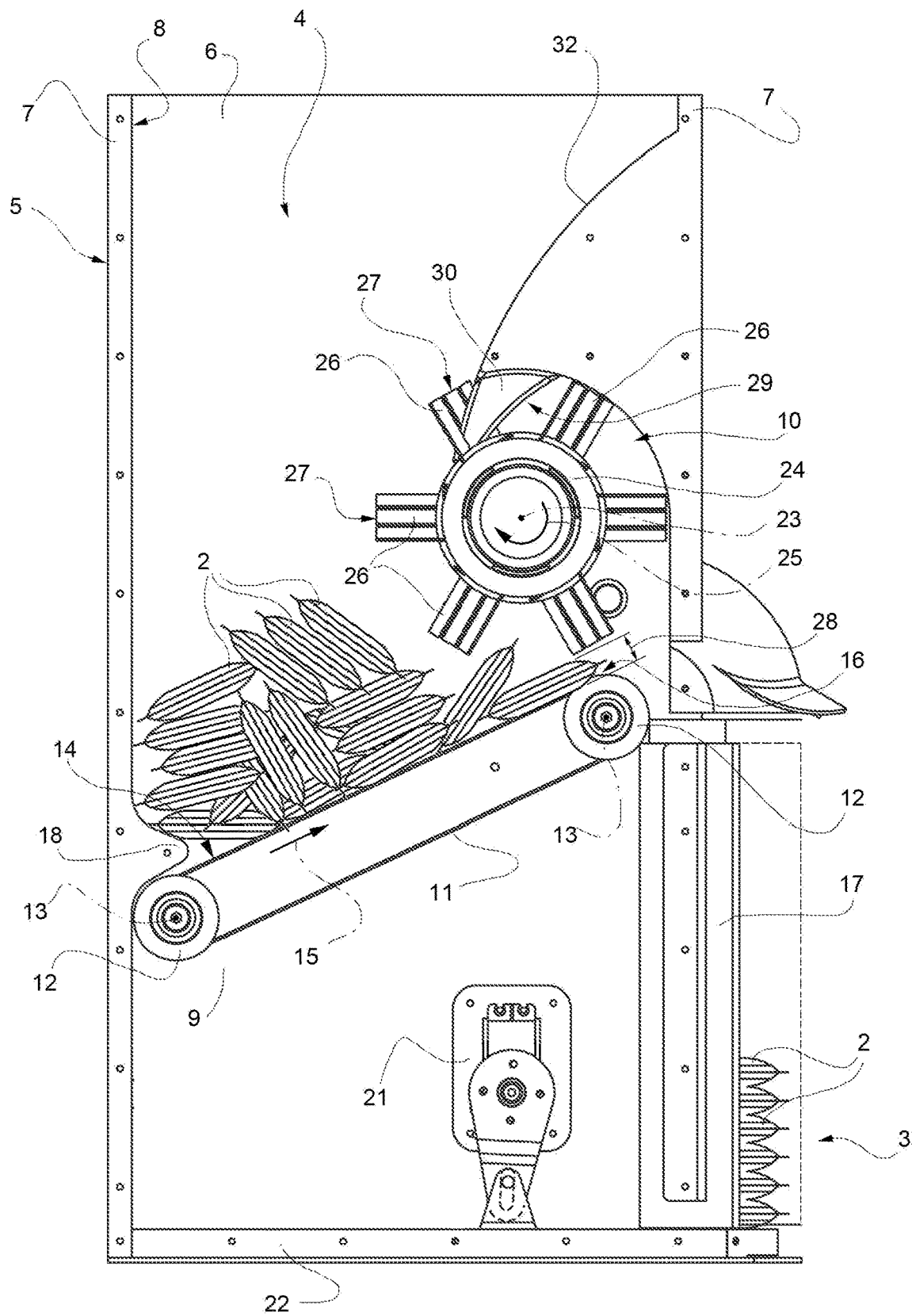
FIGS. 2 and 3 are side views, with parts removed for clarity, of the dispenser in FIG. 1.

As shown in FIGS. 1 and 2, the extractor device 9 is defined by a belt conveyor comprising a belt 11 wrapped in a loop around two rollers 12, one of them being a motorised roller, which are rotationally mounted on the longer side walls 6 to rotate about respective axes 13 parallel to each other and perpendicular to the longer side walls 6.

The two rollers 12 delimit, on the belt 11, an upper operating branch 14, which extends from one longer side wall 6 to the other on a plane perpendicular to the longer side walls 6, slides in a feed direction 15 perpendicular to the axes 13 and has an outlet 16, through which the pod 2 extracted each time from the storage compartment 4 is fed to then fall into an inlet mouth of a rigid vertical tubular element 17 to form, together with the pods 2 previously fed from the dispenser 1, a stack of pods 2.

In particular, as shown in FIG. 2, the output roller 12, i.e. the roller 12 that defines the outlet 16 on the operating branch 14, is arranged at the side of and at the same height as, or slightly above, the inlet mouth of the tubular element 17 in such a way that the pods 2 that, in use, lie flat on the belt 11 and individually reach the outlet 16, then fall down by gravity directly into the tubular element 17, becoming orderly stacked one on top the other.

In the example shown in FIG. 2, the roller 12 opposite to the output roller 12 is mounted close to the corresponding shorter side wall 7 so as to make the base of the storage compartment 4 as wide as possible and therefore increase the capacity. This roller 12 is arranged beneath a protuberance 18 jutting out transversely from the shorter side wall 7 and delimited at the top by a curved surface designed to connect the shorter side wall 7 with the operating branch 14 so as to prevent the pods 2 and, more specifically, the annular flanges of the pods 2 from jamming in the narrow gap present between the shorter side wall 7 and the curved portion of belt 11 wrapped around the roller 12.

For the same purpose, the extractor device 9 is provided with two elongated elements 19, which have a generically triangular cross-section and are arranged in fixed positions above and along respective lateral edges of the operating branch 14 to connect the operating branch 14 to the longer side walls 6.

In addition to this function of preventing the pods 2 from jamming between the belt 11 and the longer side walls 7, the elongated elements 19 also perform a further function consisting in correcting the orientation of the pods 2, which tend to stand in a vertical position in contact with the longer side walls 6 and roll along the operating branch 14. In fact, due to their shape, the elongated elements 19, act like slides that, when engaged by the flange of a pod 2, tend to make the pod 2 slide to a horizontal position so as to make it assume the correct output orientation, i.e. lying flat on the operating branch 14.

Figure 3:
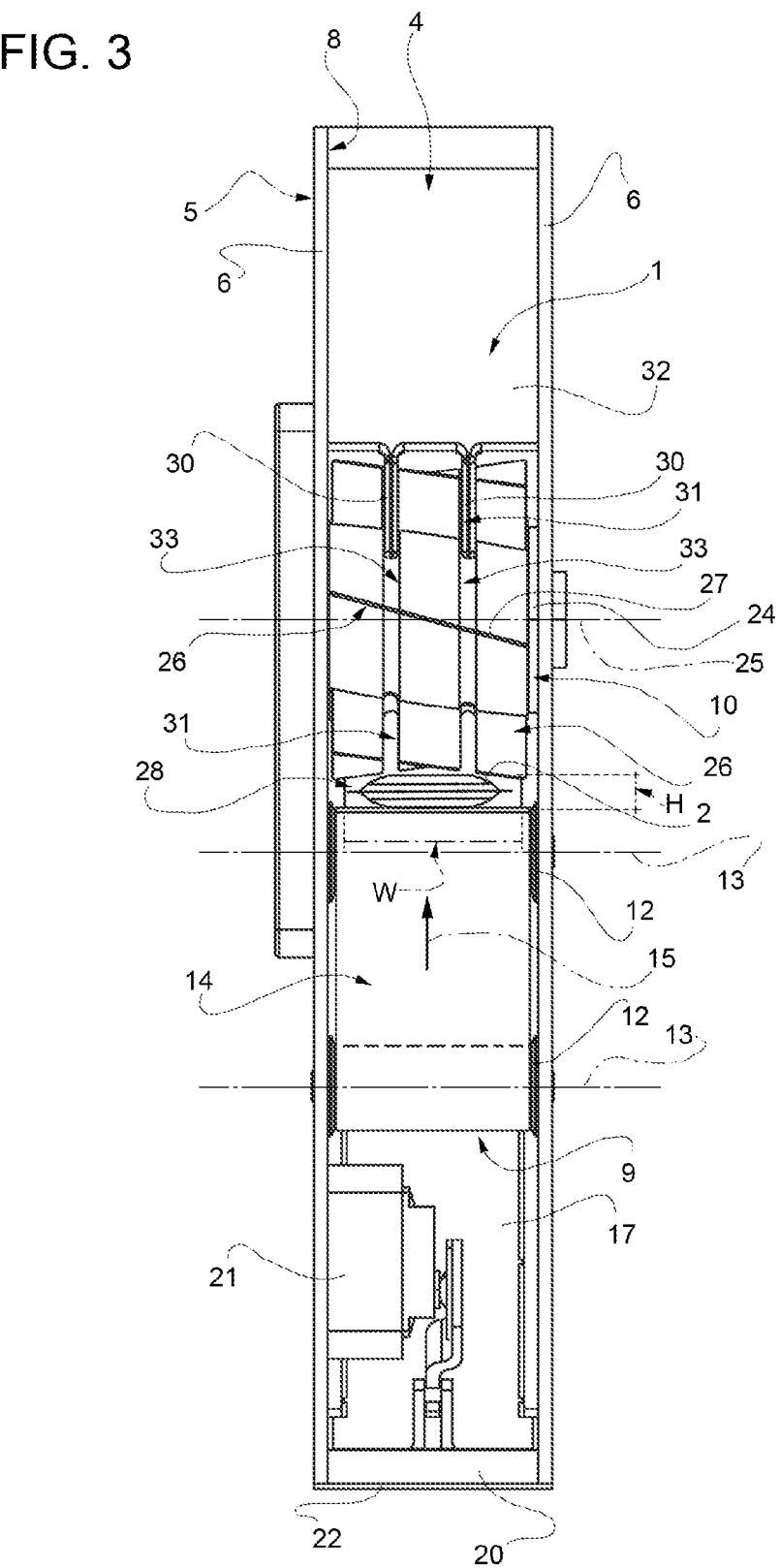

As shown in FIG. 3, the width of the belt 11 in the transverse direction approximates by excess to the diameter of the flange of a pod 2, which, when it lies flat on the operating branch 14, consequently takes up almost all the transverse width. As shall be seen further on, this fact, together with presence of the agitator 10, enables the one-by-one separation of the pods 2, i.e. enables the operating branch 14 to feed the outlet 16 with a succession of individual pods 2 aligned with each other in the feed direction 15.

According to a variant that is not shown, the transverse width of the belt 11 could be reduced, for example via lateral slides, to that of a pod 2 only in a final section of the operating branch 14.

Furthermore, as in the example shown, in order to prevent clogging on the operating branch 14, and consequently aid the one-by-one separation of the pods 2, the operating branch 14 is not horizontal, but advantageously inclined upwards in the feed direction 15. In this way, the pods 2 on top of those lying on the operating branch 14 tend to fall backwards in the opposite direction to the feed direction 15 under the effect of gravity.

As shown in FIGS. 1 and 2, the tubular element 17, to which the dispenser 1 feeds the pods 2 in succession, constitutes the storage compartment of the above-mentioned intermediate accumulator 3, which is also provided with an extraction plate 20 slidingly mounted in a horizontal direction to move, in use and under the pushing force of an actuator device 21, with a reciprocating motion across a lower outlet of the tubular element 17 so as cause, on each outgoing and return stroke, the transverse expulsion of the pod 2 at the bottom of the stack from the tubular element 17.

In the example shown, the tubular element 17 is supported by the box-shaped body 5 and is arranged beneath the outlet 16 in the space between the longer side walls 6, while the extraction plate 20 rests on a bottom wall 22 of the box-shaped body 5 to slide in a horizontal direction between the longer side walls 6.

According to a variant that is not shown, the extraction plate 20 always rests on the bottom wall, but the tubular element 17 is arranged partially or completely beneath the extractor device 9, between the longer side walls 6. In this case, the outlet 16 is connected to the inlet mouth of the tubular element 17 by a drop chute provided in the space between the output roller 12, the longer side walls 6 and the shorter side walls 7. Furthermore, according to a variant that is not shown, the tubular element 17 and the extraction plate 20 are both outside the box-shaped body 5 and the pods 2 are fed to the inlet mouth of the tubular element 17 by an opportune fixed chute.

As shown in the accompanying drawings, the agitator 10 is located inside the box-shaped body 5 above the final outlet section of the operating branch 14 and has the dual function of stirring the pods 2 inside the storage compartment 4 to prevent them forming bridges and to move away the pods 2 amassed on top of the operating branch 14 in such a way that only pods 2 lying flat on the operating branch 14 can advance one by one to the outlet 16.

In particular, the agitator 10 is defined by a motorised impeller or rotor operated to rotate in a direction of rotation 23 (clockwise in the accompanying drawings) opposite to that of the rollers 12. The rotor comprises a cylindrical hub 24 supported by the longer side walls 6 and has an axis 25 parallel to the axes 13 of the rollers 12, and a plurality of blades 26, which are mounted on the hub 24 to move, during rotation of the rotor, along a circular path comprising an operative portion that extends inside storage compartment 4 and an inoperative portion that extends outside the storage compartment 4.

The direction of rotation 23 is such that along an initial section of the operative portion, the blades 26 move in front of the operating branch 14 in a direction substantially opposite to the feed direction 15 and, along the remainder of the operative portion, they move upwards and away from the operating branch 14, consequently lifting up the pods 2 they intercept and pushing them back inside the storage compartment 4.

The blades 26 extend transversely for the entire width of the belt 11 and have respective free end edges 27 that, in rotation, define a cylindrical surface (indicated by a broken line in FIG. 2), which is coaxial with axis 23 and at the point of minimum distance from the operating branch 14 forms, with the operating branch 14, a gap 28 located upstream of the outlet 16 for the passage of the pods 2 and having a width "W" (FIG. 3) approximating by excess to a maximum diameter of one of the pods. In particular, the blades 26 are sized in a way such that the gap 28 has a height "H" (FIG. 3) approximating by excess to the thickness of a pod 2 so as to allow the passage of a single pod 2 lying flat on the operating branch 14. The width "W" and the height "H" of the gap 28 are shown in FIG. 3.

According to a preferred embodiment, the blades 26 are flat blades having straight free edges 27 and can be radial, i.e. lie on respective planes passing through the axis 25, or, preferably, as in the example shown, be inclined forward in the direction of rotation (FIG. 2).

Furthermore, the plane on which each flat blade 26 lies expediently intersects the cylindrical outer surface of the hub 24 along a line that is not parallel to axis 25, but is inclined with respect to axis 25 by a certain angle, preferably in the order of 20°-30°.

This last inclination has, in use, the effect of reducing the impact of the blades 26 on the pods 2, with a consequently lower risk of the pods 2 being damaged. In fact, in this way, the pushing force the blades 26 impart on the pods 2 has both a vertical bottom-up component and a transverse component, which moves the pods 2 sideways towards a longer side wall 6.

According to a variant that is not shown, the blades 26 are not flat, but follow a helical profile and intersect the cylindrical outer surface of the hub 24 along a curved line.

To avoid the blades 26 dragging pods 2 along the inoperative portion of their circular path during rotation of the rotor, and therefore removing them from the storage compartment 4, the dispenser 1 comprises a containment member 29 defined by a fixed barrier extending through the circular path of the blades 26 and shaped to extract the pods 2 from the spaces between the blades 26 while they travel along a final section of the operative portion of their path.

Figure 4:
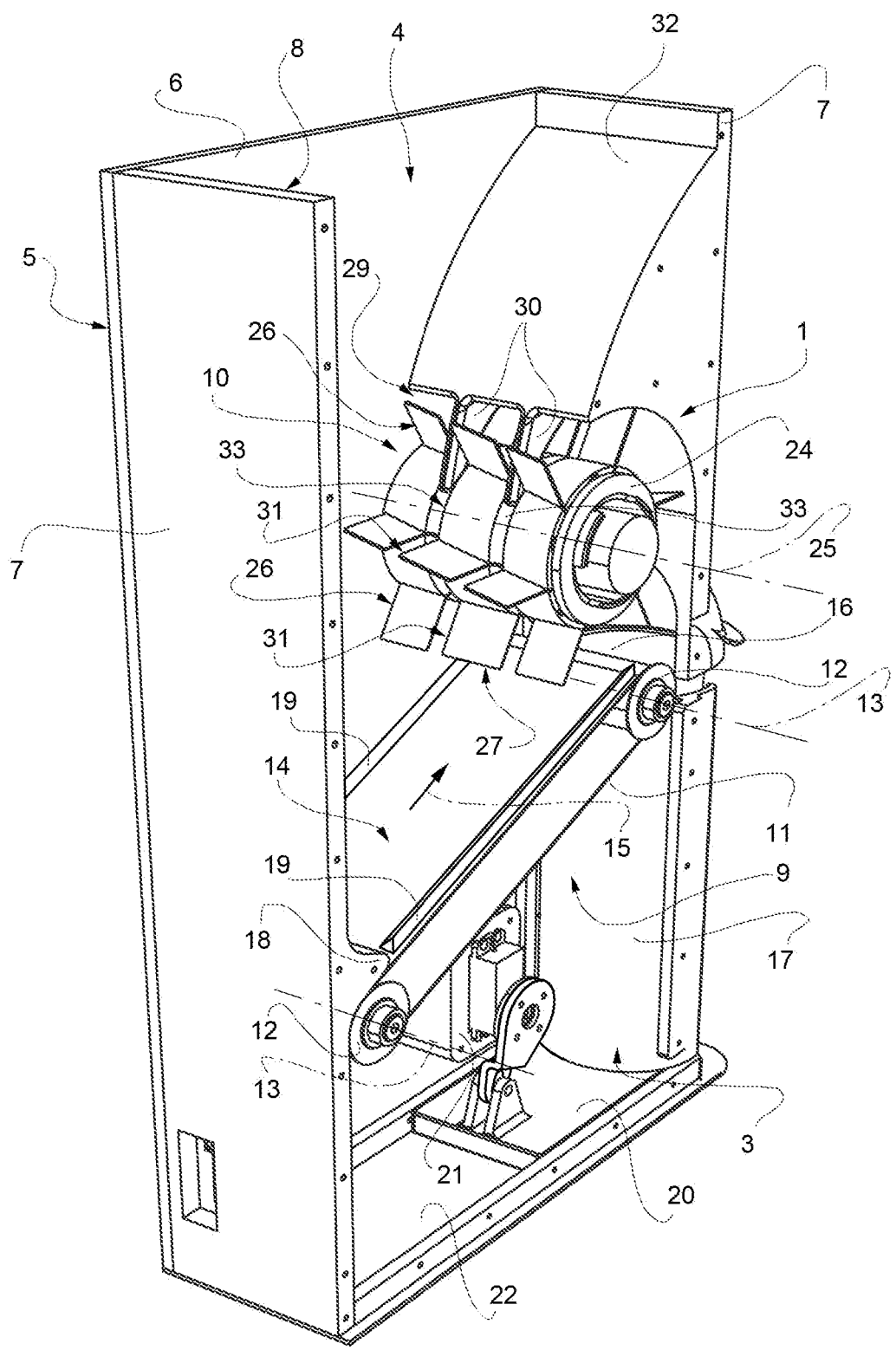
FIG. 4 is a perspective view, from a different angle and with parts removed for clarity, of the dispenser in FIG. 1.

In particular, as shown in FIG. 4, the containment member 29 comprises a plurality of fixed barrier elements 30 designed to engage, during rotation of the rotor, respective openings 31 in each blade 26.

The barrier elements 30 are supported by a fixed wall 32, which is arranged inside the box-shaped body 5 above the agitator 10 and in a position facing a shorter side wall 7, and is shaped so as to define, with the longer side walls 6 and with the other shorter side wall 7, a hopper inside the storage compartment 4 and communicating with the loading opening 8.

The barrier elements 30 are rigidly connected to, or integral with, wall 32, from which they project downwards, lie on respective planes substantially parallel to axis 25, and are shaped, in particular curved, so as uncoil around the hub 24 on a final section of the operative portion of the path of the blades 26.

Preferably, in order to prevent the flanges of the pods 2 becoming caught between the blades 26 and the barrier elements 30, the top end of the barrier elements 30, i.e. the end connected to wall 32, is arranged approximately on the cylindrical surface defined by the free edges 27 of the blades 26 during their rotation, as in the example shown.

The openings 31 that are engaged by the barrier elements 30 during rotation of the blades 26 can be grooves extending for part of the height of the associated blade 26.

Advantageously, as in the example shown, the openings 31 extend for the entire height of the associated blade 26. This configuration has the advantage of preventing the flanges of the pods 2 jamming between the free bottom ends of the barrier elements 30 and the hub 24. In fact, in this case, thanks to the full extension of the openings 31, the barrier elements 30 can be shaped in such a way that the respective free bottom ends slidingly engage respective annular grooves 33 in the outer surface of the hub 24 coaxial with axis 25 (FIG. 4). In this way, the barrier elements 30 are connected to the hub in a continuous manner, without the presence of gaps in which the flanges of the pods 2 could enter and become jammed.

In the preferred embodiment shown in the accompanying drawings, the barrier elements 30 are constituted by thin sickle-shaped plates having a curved outer edge designed to be engaged by the pods 2 during rotation of the blades 26.

According to a variant that is not shown, the barrier elements 30 can be constituted by straight or curved bars. In addition, wall 32 can be defined by an extension of the thin plates or bars, as long as the distance between the thin plates or between the bars is such as to prevent the pods 2 from falling out of the storage compartment 4.

The operation of the dispenser 1 clearly emerges from the above description and requires no further explanation.

In conclusion of the above, it is opportune to point out a further advantage of the preferred embodiment described and illustrated herein. This advantage consists in that the box-shaped body 5, in addition to defining the storage compartment of the dispenser 1, supports and internally houses the extractor device 9, the agitator 10 and the intermediate accumulator 3. Thus, in this way, the box-shaped body 5 and all the other components listed above constitute an extremely compact assembly, particularly suitable for defining a module designed to be used, together with other identical modules, inside a vending machine designed to dispense different types of pods. In this regard, in order to make the types of pods dispensable by the vending machine externally visible to users, the tubular elements 17 could be advantageously made of a transparent material and arranged inside the vending machine in a position facing a window provided in the front panel of the vending machine, so as to make the stacks of pods 2 contained in the respective tubular elements 17 visible from the outside. In this case, each tubular element 17 is expediently provided with a light source (indicated by reference numeral in the accompanying drawings) designed to illuminate the associated stack of pods 2 from above.

The invention claimed is:

1. A pod dispenser to dispense pods for brewed beverages, the pod dispenser comprising:
a magazine configured for randomly distributed pods;
a conveyor configured to individually extract the pods from the magazine to feed the pods to an outlet, wherein the conveyor includes a belt conveyor having a belt looped about rollers, which define, on the belt, an upper operative portion sliding in a feed direction; and
an agitator device configured to cooperate with the conveyor for pushing the pods away from the conveyor and to define, with the conveyor, upstream from the outlet, a gap sized to allow pods that lie flat on the conveyor to reach the outlet;
wherein the agitator device includes an impeller having a hub, which is rotatably mounted about an axis transverse to the feed direction to rotate in a direction opposite to a rotation direction of the belt, and blades, which, during rotation of the impeller, define, with the upper operative portion, the gap;
wherein the blades are sized such that the gap has a height approximating by excess to the thickness of one of the pods so as to allow the passage of a single one of the pods lying flat on the upper operating portion;
wherein the gap is sized so as to have a width approximating by excess to a maximum diameter of one of the pods.

2. The pod dispenser of claim 1, wherein the upper operative portion is inclined upwards in the feed direction so as to result in the pods over the upper operative portion tending to fall backwards under gravity.

3. The pod dispenser of claim 1, wherein the blades intersect an external surface of the hub along a line inclined with respect to the axis.

4. The pod dispenser of claim 1, wherein:
the upper operative portion is movable between two fixed walls laterally bounding the magazine; and
the belt conveyor includes two elongated elements that extend along respective side edges of the upper operative portion to connect the upper operative portion to the fixed walls and are configured to cause the pods to lie flat on the upper operative portion.

5. The pod dispenser of claim 1, further comprising:
wherein the blades are movable along a circular path coaxial with the axis and having an operative path extending inside the magazine and an inoperative portion extending outside the magazine; and
a border member configured to cooperate with the impeller so as to cause the blades to fail to convey the pods out of the magazine when passing from the operative path to the inoperative portion.

6. The pod dispenser of claim 5, wherein the border member includes at least a fixed barrier element, which lies on a plane substantially perpendicular to the axis and intersects the blades so as to cause the pods to be expelled from spaces between the blades while the blades run through an end section of the operating path of the circular path.

7. The pod dispenser of claim 6, wherein the blades have a radial opening sized to be transversely engaged by the fixed barrier element during rotation.

8. The pod dispenser of claim 6, wherein the hub has at least one annular groove coaxial to the axis and slidingly engaged by a free end of the fixed barrier element.

9. A pod dispensing module, comprising:
 a pod dispenser;
 a pod accumulator;
 a box-shaped body that houses, in an upper part, the pod dispenser and, in a lower part, the pod accumulator;
 wherein the pod dispenser includes:
  a magazine configured for randomly distributed pods;
  a conveyor configured to individually extract the pods from the magazine to feed the pods to an outlet, wherein the conveyor includes a belt conveyor having a belt looped about rollers, which define, on the belt, an upper operative portion sliding in a feed direction; and
  an agitator device configured to cooperate with the conveyor for pushing the pods away from the conveyor and to define, with the conveyor, upstream from the outlet, a gap sized to allow pods that lie flat on the conveyor to reach the outlet;
  wherein the agitator device includes an impeller having a hub, which is rotatably mounted about an axis transverse to the feed direction to rotate in a direction opposite to a rotation direction of the belt, and blades, which, during rotation of the impeller, define, with the upper operative portion, the gap;
  wherein the blades are sized such that the gap has a height approximating by excess to the thickness of one of the pods so as to allow the passage of a single one of the pods lying flat on the upper operating portion;
 wherein the gap is sized so as to have a width approximating by excess to a maximum diameter of one of the pods
 wherein the pod accumulator includes:
  a container that communicates with the outlet for individually receiving the pods and is shaped to accommodate the pods arranged in a vertical stack; and
  an extractor operable to extract, one at a time, the pods from the bottom of the stack.

\* \* \* \* \*